United States Patent [19]

Hansen

[11] 4,043,463
[45] Aug. 23, 1977

[54] MATERIAL STORAGE FRAME SUPPORT AND VEHICLE GUIDE STRUCTURE

[75] Inventor: Howard C. Hansen, Battle Creek, Mich.

[73] Assignee: Clark Equipment Company, Buchanan, Mich.

[21] Appl. No.: 695,666

[22] Filed: June 14, 1976

[51] Int. Cl.² .............................................. B65G 1/06
[52] U.S. Cl. .............................................. 214/16.4 A
[58] Field of Search .................... 214/16.4 A, 16.4 C, 214/16.4 B, 730; 108/42; 312/249, 250; 211/191, 134

[56] References Cited

U.S. PATENT DOCUMENTS

| 3,343,692 | 9/1967 | Arnot | 214/16.4 A |
| 3,759,403 | 9/1973 | Fernstrom | 214/16.4 A |
| 3,836,031 | 9/1974 | Welsker et al. | 214/16.4 A |

Primary Examiner—Lawrence J. Oresky
Attorney, Agent, or Firm—John C. Wiessler

[57] ABSTRACT

Material storage frames or rack assemblies in warehouses are set up in long parallel spaced rows which form narrow aisles therebetween. Each rack assembly has vertical columns and horizontal rows of bins for the storage of material. A pair of Z-rails confront each other from opposite sides of each aisle having oppositely extending bottom flanges secured rigidly to the floor and upper flanges extending inwardly of the aisle which form guide tracks with the web of the Z and the floor. Vertical support posts of the rack located adjacent the aisle are spaced longitudinally of the aisle and rest upon the adjacent floor mounted Z-rail flange, whereas the lowermost row of stored material units, usually palletized, are adapted to be supported by the respective upper flange portion of each Z-rail between the pairs of vertical posts or each storage rack. Side mounted guide rollers, such as may be associated with a fending guide plate assembly for vehicles such as lift trucks, are adapted to engage the tracks formed by the confronting Z-rails so that the vehicle travels along the aisle in a restrained system.

3 Claims, 3 Drawing Figures

MATERIAL STORAGE FRAME SUPPORT AND VEHICLE GUIDE STRUCTURE

BACKGROUND OF THE INVENTION

The field of art to which the invention pertains includes material handling storage racks having a vehicular restraint system associated therewith.

In order to conserve high cost floor space in warehouses and other storage buildings, material storage racks are located longitudinally closely adjacent one another so as to form very narrow aisles between rows of storage racks. The development of side-loader and order selector types of industrial trucks and stackers parallels the construction of very narrow aisle warehouses which has generated a requirement for mechanical constraints or guide means to insure vehicle movement in precise predetermined paths in the aisles between the rows of storage racks. The use of the narrowest possible aisle combined with vehicle guidance is advantageous both in maximizing the use of storage space, in insuring the capability of deposit and retrieval of loads from storage locations on both sides of the aisle without maneuvering the vehicle, and in eliminating any requirement for steering control by an operator, thereby permitting the operator to attend to other tasks.

Heretofore such vehicle guidance has been provided usually by the use of structural steel angle rails bolted to the floor along each side of each aisle and having installed low on each side of the guided vehicle pairs of side guide rollers in such a manner that when the vehicle is in the aisle the rollers contact the guide rails so that it is constrained to travel in a straight line between the rails.

A problem frequently encountered in the art concerns the provision of means for insuring without over stressing and damaging vehicle parts, the alignment of the vehicle for entry into such a guide rail system. This has been accomplished previously by such means as outwardly flared guide rail throats or entry ways at the head of each aisle so that during entry the vehicle is forcibly aligned to enter the straight-line portion of the aisle. Inherent in this solution is the problem of resisting the relatively high forces developed during a misaligned entry, particularly when the vehicle is heavily loaded. Such entry forces must be absorbed by the side guide rollers and means for mounting the rollers on the vehicle. Such forces are produced by initial impact of heavy vehicles with guide rails at entry sections, and by friction forces resulting from sliding such vehicles sideways to achieve initial alignment. One solution has been to use heavy springs to provide a resilient entryway for absorbing such forces, such as disclosed in U.S. Pat. No. 3,710,524. As a practical matter, however, the cost of such a construction in a typically large storage building is prohibitive.

My U.S. Pat. No. 3,850,111 discloses such a system in which the invention is directed to the construction and mounting of a guide plate assembly adapted particularly for material handling vehicles such as lift trucks.

Canadian Pat. No. 924,249, granted Apr. 10, 1973, discloses a materials storage frame supporting structure for use with automated storage and retrieval equipment in which floor mounted I-beams are utilized for providing tracks retaining roller mounted base structure of a material handling stacker machine and having vertical support posts of the storage frame structure supported from the upper flange of each I-beam which extends longitudinally of the aisle formed between the storage frame.

Side loading fork lift trucks such as is disclosed in my U.S. Pat. No. 3,850,111 utilize in such systems lift truck attachments capable of maneuvering palletized loads at various elevations in and out of bins on either side of the aisle and of actuating the pallet and load to a straight-ahead position on the attachment so that the truck may then travel to the end of the aisle and upon leaving the restraint system of the structure be maneuverable by the operator as desired. An exemplary side loader attachment is disclosed in U.S. Pat. No. 3,762,588. Usage of this type of truck is increasing as a result of the economies of handling materials in reduced aisle widths at increased stacking heights, the faster and more orderly handling of loads, and increased safety.

Operators of order selector trucks, on the other hand, ride on the lift platform to the various storage levels in the storage rack system and there select individual items. Stability or restraint against tipping forwardly or rearwardly in the aisle due to the application of brakes or acceleration of the truck is an important safety consideration. It is required that the travel speed of the truck be decreased as the lift carriage and loads are elevated, the deceleration being usually imposed electrically and automatically in such order selector trucks. As pay loads and storage heights in such systems increase, the vulnerability to tipping increases unless a satisfactory restraint system is utilized. Otherwise the productivity of both order selectors and side loader lift trucks is substantially reduced because of the necessity to operate at relatively low speeds when loads are elevated.

SUMMARY

My invention provides a material storage frame and support structure in combination with a vehicle restraint system for narrow aisle load handling operations in aisles formed between storage frames wherein restraints or guide rails are formed by longitudinally extending confronting pairs of Z-rails which are a part of and rigidified by the vertical posts of the frame and the lower row of pallets or loads supported from respective ones of the upper horizontal flanges of each Z-rail.

An important object of the invention is to provide an improved storage frame and guide rail system forming narrow aisles in which load handling vehicles travel in a fixed path cooperating with Z-rails to prevent longitudinal tipping movement of the vehicle in either direction.

DESCRIPTION OF THE PREFERRED EMBODIMENT

Figure 1:
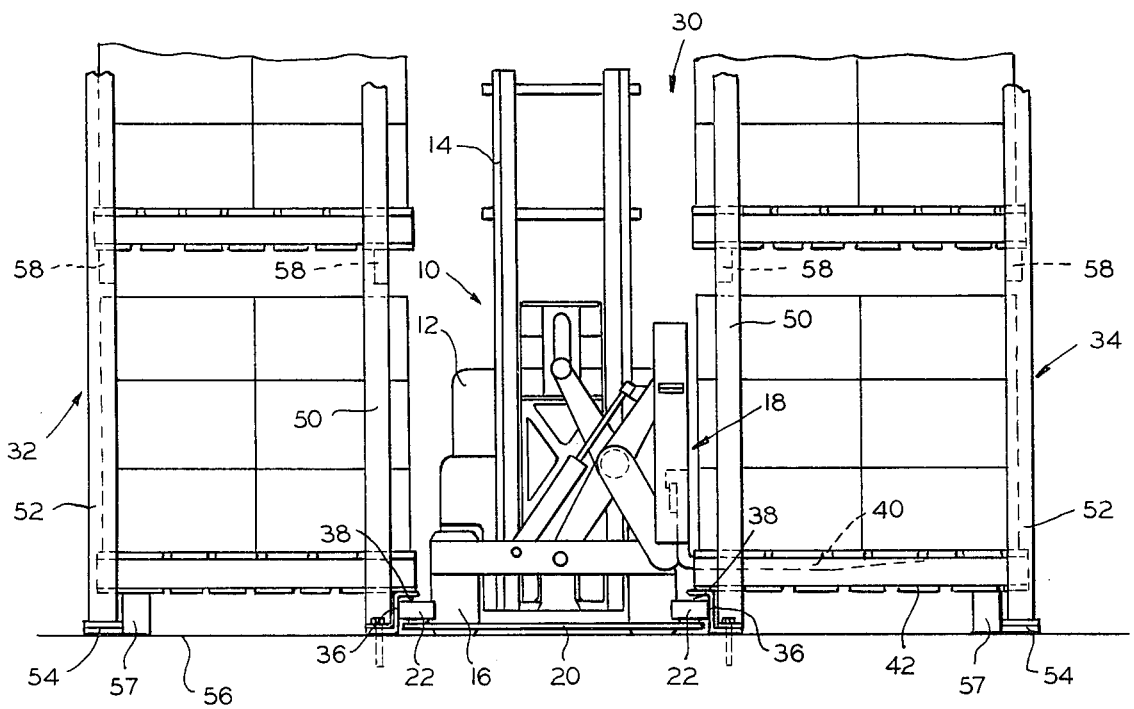
FIG. 1 is a front elevational view of a lift truck with a side loading attachment and a guide plate constrained in an aisle formed between material storage frame structure.

A lift truck is shown in front elevational view at numeral 10 having a body 12, an upright assembly 14 mounted in a conventional manner from a drive axle which is connected to front drive wheels 16, a side loader shown generally at 18, and a guide plate assembly 20 having front and rear pairs of longitudinally spaced guide rollers 22, one pair of which is shown, mounted from beneath the chassis of the truck, all as described in detail in the aforementioned U.S. Pat. Nos. 3,762,588 and 3,850,111. As shown, the lift truck is located in a stationary constrained position in an aisle 30 formed between storage frame structures 32 and 34 which include longitudinally and confronting Z-rails 36 for constraining within the guide tracks 38 formed thereby the guide rollers 22. Side loader attachment 18 includes a fork carrier 40 which, as shown, is extended to the right side of the truck by the pantograph of the side loader in engagement with a load carrying pallet 42 to either deposit or remove the same from the respective first level bin of storage frame 34 in known manner.

Figure 2:
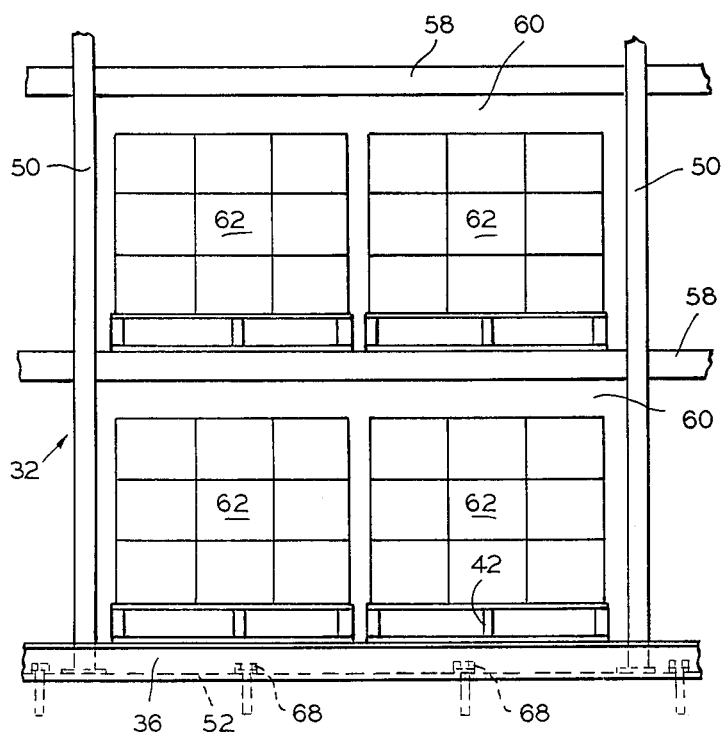
FIG. 2 is an elevational view of a portion of such storage frame structure as viewed from the aisle.
Figure 3:
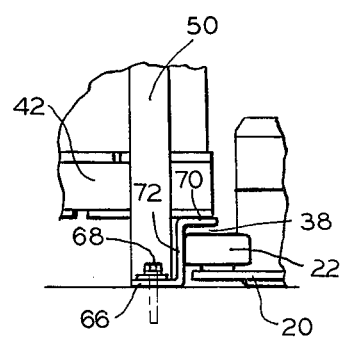
FIG. 3 is an enlarged partial view of the Z-rail and associated storage frame members of my invention.

Each storage frame comprises a plurality of longitudinally spaced vertical posts 50, two of which are shown in FIG. 2 at the aisle side of the frame structure, and corresponding vertical posts 52 at the opposite sides supported from pads 54 on a relatively smooth concrete floor 56. A single aisle only is shown between two storage frames, but, of course, the aisles and storage frames can be multiplied in a warehouse as desired with Z-rails associated with both sides of each storage frame. As shown herein, longitudinals 57 are located at the rear of the storage frames at floor level for supporting the rear sides of the lower level of stored palletized loads 62. Each frame structure includes a plurality of vertically spaced longitudinals 58 which are secured to posts 50 and 52 at both the front and rear thereof to form with the posts a plurality of rows and columns of elevated bins 60 for supporting multiple palletized loads 62.

Each Z-rail 36, preferably of structural steel, includes a flange 66 bolted to the concrete floor by means of heavy masonry bolts 68 which are tightened with great force. The upper flange 70 extends inwardly of the aisle in confronting relation to the opposite Z-rail in the aisle forming the guide track 38 between each upper flange, the web 72 and the floor. Posts 50 which border the aisle are located upon and fixed to the flange 66 so that a large portion of the weight of the storage frame structure, including the weight of the loads and pallets stored in the bins, aid in holding the Z-rails securely to the floor. In addition, the flange 70 of each Z-rail provides the forward support of the lower level of palletized loads 62, thus providing additional downward force on the Z-rails and further rigidifying and securing firmly the entire Z-rail structure.

Side guide rollers 22 roll along the inner web surfaces of the Z-rails forcing the truck to negotiate straight-line travel; they extend under and in close spaced relation to upper flanges 70, but in the event of a tipping moment sufficient to raise either the front or rear truck wheels clear of the floor the respective pair of guide rollers 22 contact upper flanges 70 to prevent forward or rearward tipping thereof.

In the use of my unique arrangement of Z-rails and storage frame structure there is provided a fully effective vehicle restraint system of minimum complexity, cost and mass.

I claim:

1. A material handling and storage system comprising a pair of material storage frames supported on the floor and forming an aisle therebetween, said storage frames forming a multiplicity of columns and rows of storage bins for material loads, the storage frame structure including a pair of confronting longitudinally extending continuous Z-rails forming guide tracks in said aisle adjacent the floor, each Z-rail having its lower horizontal flange secured to the floor and its upper horizontal flange extending towards the aisle and forming with the vertical web thereof a guide track, a plurality of longitudinally spaced vertical posts adjacent each side of said aisle forming a portion of said pair of storage frame structures, each post resting and being supported upon said lower horizontal flange of the adjacent Z-rail, the lower row of material loads being supported adjacent said aisle from the upper flange of the Z-rail, a substantial portion of the weight of the storage frame structure and material loads located in the bins above the first row of bins thereof being imposed upon the floor mounted flange of each Z-rail, and a substantial portion of the weight of the material loads stored in the lower rows of bins of each frame structure being imposed upon the continuous upper flange of the respective Z-rail and a wheeled vehicle operable in said aisle for depositing and retrieving material loads in said storage bins having front and rear pairs of side guide rollers constrained in the guide tracks formed by said Z-rails.

2. A material handling and storage system as claimed in claim 1 wherein said guide rollers are adapted to engage in rolling contact the vertical webs of said Z-rails and are located normally in spaced relation to the upper flanges of the Z-rails, said Z-rails and storage frame providing a vehicular restraint system which imposes straight-line travel on the vehicle when operating in said aisle and prevents forward or rearward tipping of the vehicle as the upper surfaces of said front or rear pairs of side guide rollers contact the upper flanges of said Z-rails.

3. A material handling and storage system as claimed in claim 2 wherein said vehicle is a masted lift truck having a side loading attachment means adapted to retrieve loads from any selected bin in the storage frame at either side of the aisle and negotiate the aisle with a material load carried ahead of the truck.

* * * * *